United States Patent [19]
Kishi et al.

[11] Patent Number: 5,797,560
[45] Date of Patent: Aug. 25, 1998

[54] METHOD AND DEVICE FOR CONTINUOUSLY FEEDING FILM

[75] Inventors: Takuji Kishi; Motoaki Murakami; Kimiharu Ohtani, all of Wakayama, Japan

[73] Assignee: Noritsu Koki Co., Ltd., Wakayama, Japan

[21] Appl. No.: 688,969

[22] Filed: Jul. 31, 1996

Related U.S. Application Data

[63] Continuation of Ser. No. 261,033, Jun. 14, 1994, abandoned.

[30] Foreign Application Priority Data

Jun. 15, 1993 [JP] Japan ................. 5-143690
Mar. 30, 1994 [JP] Japan ................. 6-060568

[51] Int. Cl.$^6$ .............. B65H 39/14; B65H 20/02; B65H 27/00; B65H 75/48
[52] U.S. Cl. .............. 242/528; 242/564.4; 242/547; 242/397.5; 242/354; 242/390.3; 242/390.9; 226/37
[58] Field of Search ............ 242/528, 564.4, 242/547, 397.5, 354, 348.3, 390.9, 390.8, 390.2, 390.3; 53/118, 430; 226/181, 37

[56] References Cited

U.S. PATENT DOCUMENTS

| | | | |
|---|---|---|---|
| 1,138,483 | 5/1915 | Johnston | 242/397.5 |
| 1,761,592 | 6/1930 | Seidel | 242/397.5 X |
| 1,825,782 | 10/1931 | Duff | 242/528 X |
| 4,103,841 | 8/1978 | Flynn et al. | 242/547 X |
| 4,107,508 | 8/1978 | Izumi et al. | 226/37 X |
| 4,218,135 | 8/1980 | Tsuda et al. | 242/564.4 X |
| 4,411,725 | 10/1983 | Siegel | 156/353 |
| 4,690,344 | 9/1987 | Yokota | 242/564.4 X |
| 4,798,375 | 1/1989 | Yamamoto | 271/82 |
| 4,928,897 | 5/1990 | Satou et al. | 242/564.4 |
| 5,400,982 | 3/1995 | Collins | 242/564.4 X |

FOREIGN PATENT DOCUMENTS

| | | |
|---|---|---|
| 0 357 355 | 3/1990 | European Pat. Off. |
| 32 06 251 | 9/1983 | Germany |

*Primary Examiner*—John Q. Nguyen
*Attorney, Agent, or Firm*—Wenderoth, Lind & Ponack, L.L.P.

[57] ABSTRACT

Films to be fed to a photographic printing apparatus are continuously fed one after another without being spliced together. A continuous film feed device has a case, a film core rotatably mounted in the case, and film presser arms each having a presser roll for pressing the films toward the center of the film core. The films are wound around the film core with their ends overlapped by putting a leading end of each film under a trailing end of the preceding film.

4 Claims, 10 Drawing Sheets

METHOD AND DEVICE FOR CONTINUOUSLY FEEDING FILM

This application is a continuation of now abandoned application, Ser. No. 08/261,033, filed Jun. 14, 1994.

BACKGROUND OF THE INVENTION

This invention relates to a method and device for continuously feeding films to a photographic printing apparatus.

Heretofore, when printing photos in a photographic printing apparatus, it was necessary to feed a plurality of films either in separate rolls or spliced with adhesive tapes and wound in a single roll into the printer through a film inlet thereof. The films were then fed to a printing/exposure stage.

Before feeding films into the photographic printing apparatus through its inlet, it was necessary to accommodate rolls of film in separate cartridges provided near the film inlet or to put a roll of spliced films in a single case. However, both of the above-described methods have a problem in that the number of films which can be set is limited in view of the mounting position and the like. It is troublesome to mount cartridges each accommodating one film or to splice a plurality of films together and then separate them from one another. This also necessitates the use of a continuous film feed device having a complex structure.

In order to solve this problem, there has been proposed a continuous film feed device in which films are wound with their ends overlapped instead of being spliced. The films thus wound are accommodated in a case while kept pressed by a spring presser member so that they may not loosen. However, since this device is provided with no means for holding in position the leading end of the first one of the films thus wound, the leading end may retract in the feed device when detaching the film feed device from the photographic printing apparatus. Thus, when mounting such device on a photographic printing apparatus, the film leading end has to be pulled out of the case through its outlet. This operation is troublesome and can damage the film leading end.

SUMMARY OF THE INVENTION

It is an object of this invention to provide a method and a device, for continuously feeding a plurality of films wound in a case with their ends overlapped, free of the above said problems.

It is another object of this invention to provide a continuous film feed device which can keep in position the film feeding end simply by closing the lid of the case, thereby holding the film leading end in position reliably, safely and at low cost.

As means to solve the above objects, there is provided, according to this invention, a method of continuously feeding films comprising the steps of winding a plurality of films one after another around a film core rotatably supported in a case, with adjacent ends of adjacent films overlapped in such a manner that the leading end of each film lies under the trailing end of the preceding film wound immediately before the former film, and feeding the films continuously by pulling out each file by use of overlapped portions.

In such case, films are preferably wound around the core with their ends overlapped while pressing them toward the center of the core with rollers.

The device for carrying out the above-mentioned method of the invention comprises a case having a lid which can be opened, a film core rotatably supported in the case, a film presser means provided around the film core and comprising rollers for pressing against the film core the films wound around the film core with the leading end of each film slid under the trailing end of the preceding film. The case has an outlet through which the films are pulled out, a feed roller provided outside the case near the outlet, and a mating roller provided inside the case and opposite to the feed roller for feeding the films in cooperation with the feed roller.

To carry out the second object, this device is preferably designed such that the mating roller has a shaft urged by an elastic member so as to be movable. An opening for receiving the feed roller is formed near the mating roller, and an inner surface of the lid at a portion between the feed roller and the mating roller is formed as a presser for pressing the films fed therebetween.

According to the present invention, films are wound around the core with their ends overlapped without splicing them together. The films thus wound are fed continuously. When winding films, the leading end of each film is slid or inserted under the trailing end of the preceding film. Since the overlapped portions thus formed are pressed by rollers at all times, the films can be fed continuously without the need to splice their ends. Since the films are pressed by rollers toward the center of the core while being wound, they are reliably wound around the core. The feeding device has a feed roller and a mating roller provided opposite to each other. Films are fed continuously by these rollers.

According to the present invention, the mating roller is supported by an elastic member so that its axis is movable, an opening for receiving the feed roller is formed near the mating roller, and the inner surface of the lid at a portion between the feed roller and the mating roller is formed as a presser for pressing films. With this arrangement, while the feed roller and the mating roller are in engagement with each other, the area of contact therebetween, where the film is sandwiched, is located inwardly of the inner surface of the lid of the case. While not in use, the film leading end is held between the inner surface of the lid and the mating roller.

With the continuous film feeding method according to the present application, a plurality of films are wound around the core with their ends overlapped so that they can be fed one-by-one continuously. Thus, unlike conventional arrangements, there is no need to set cartridges of films or to splice a plurality of films together with tapes. This makes it possible to continuously and automatically feed a plurality of films.

BRIEF DESCRIPTION OF THE DRAWINGS

Other features and objects of the present invention will become apparent from the following description made with reference to the accompanying drawings, in which.

3

Figure 8:
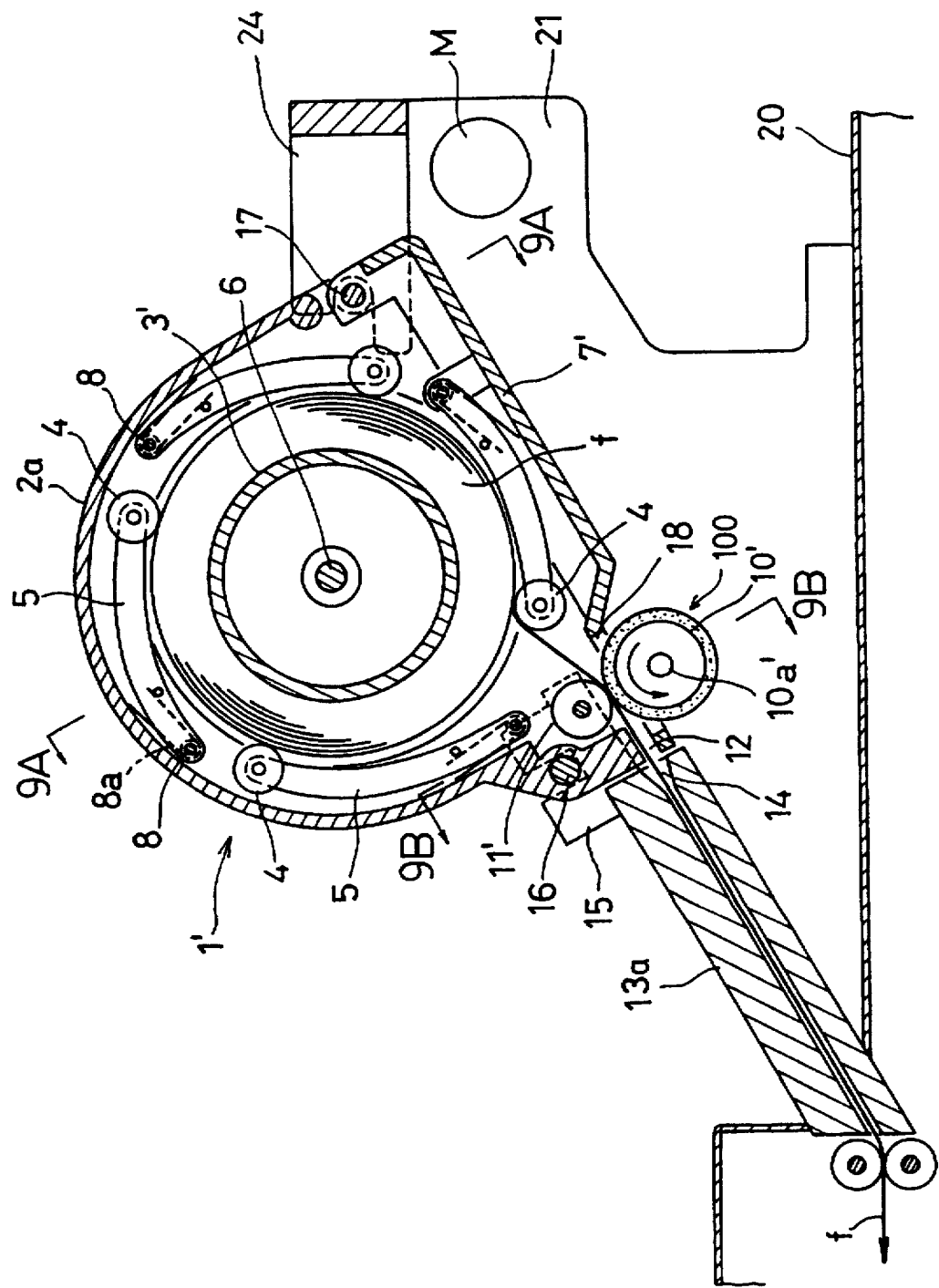
FIG. 8 is a vertical sectional view of the embodiment of FIG. 7.
Figure 9A:
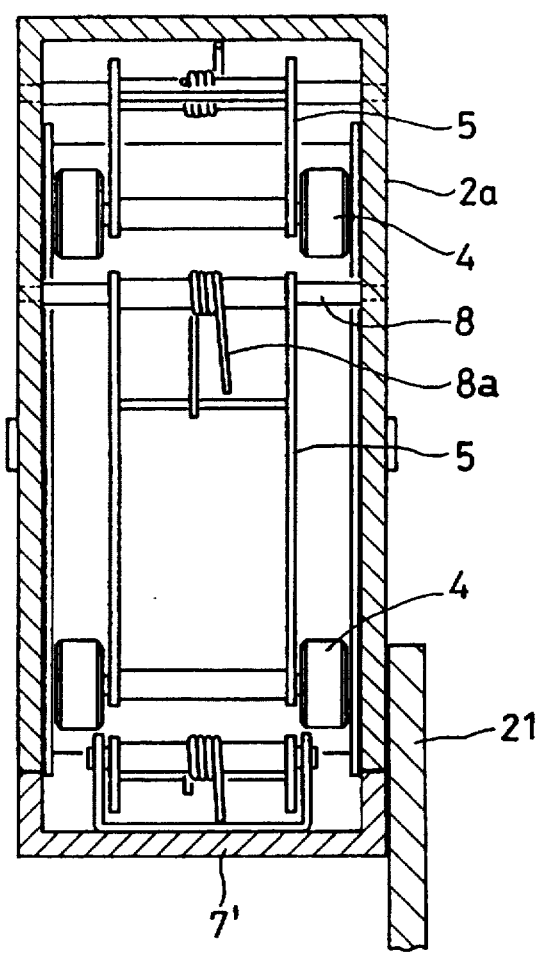
Figure 9B:
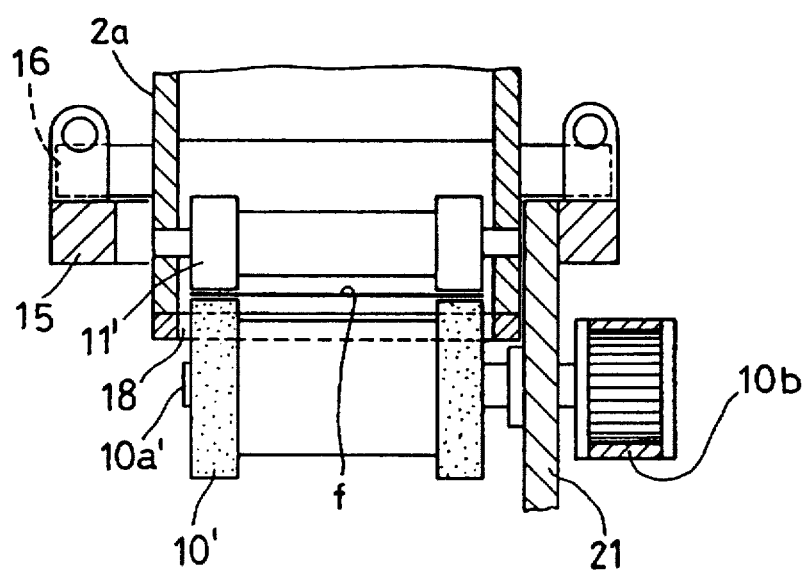
Figure 10:
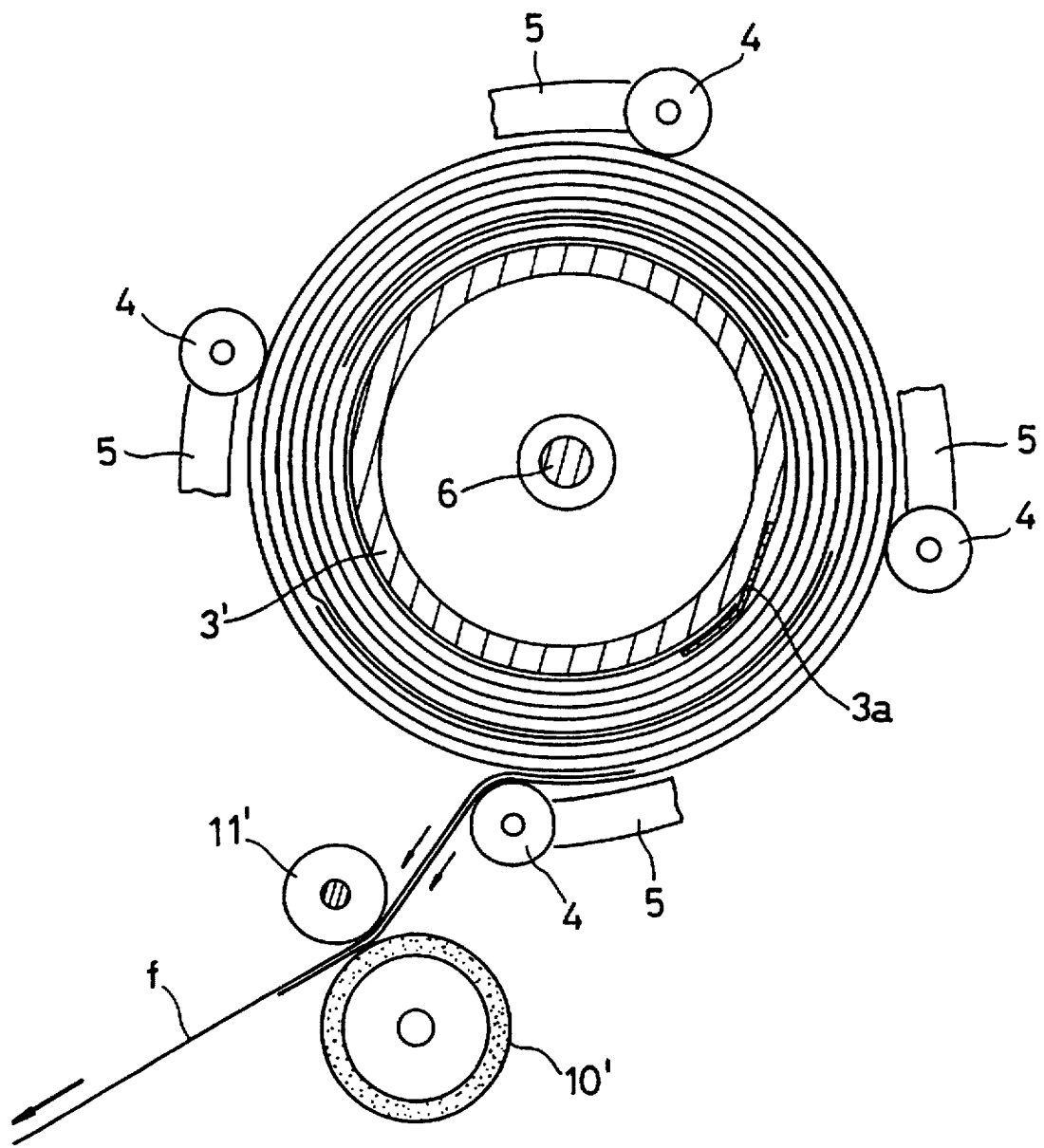
Figure 11A:
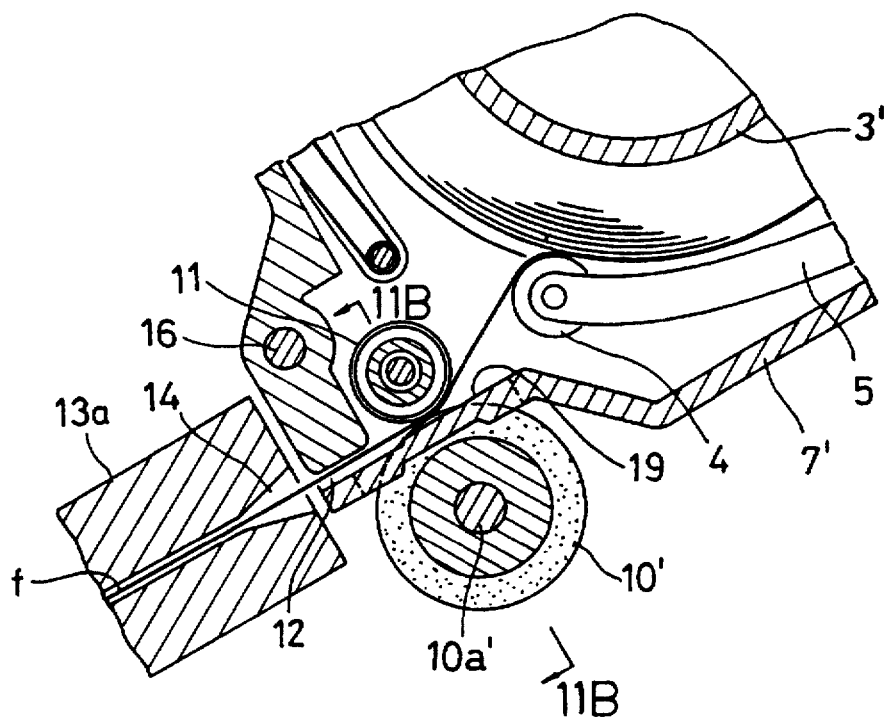
Figure 11B:
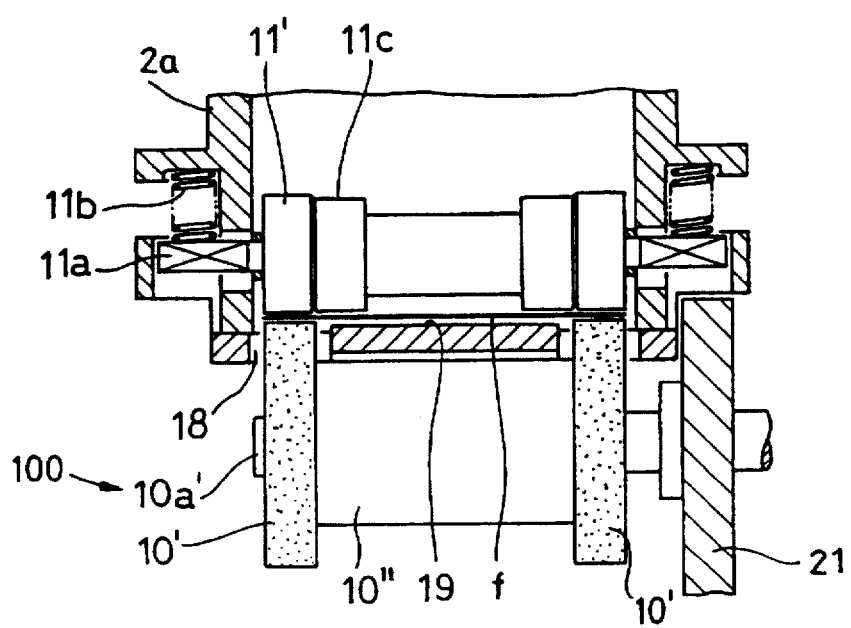
Figure 12A:
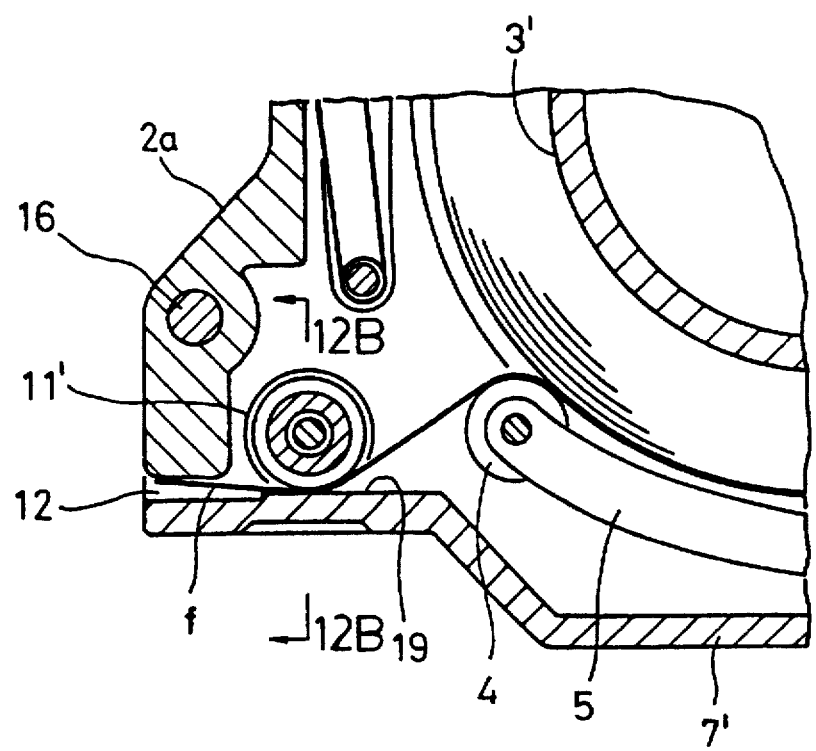
Figure 12B:
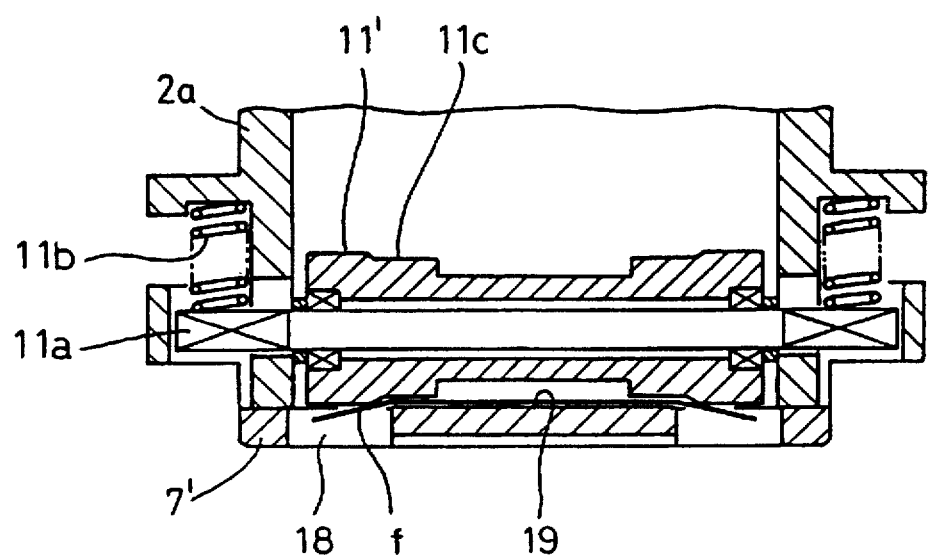

FIGS. 9A and 9B are sectional views taken along lines 9A—9A and 9B—9B of FIG. 8;

FIG. 10 is a view showing how the films are wound;

FIG. 11A is an enlarged sectional view of the portion of the device near feed rollers thereof, and FIG. 11B is a sectional view taken along line 11B—11B of FIG. 11A; and FIG. 12A is an enlarged sectional view of the portion of the device near mating rollers thereof, and FIG. 12B is a sectional view taken along line 12B—12B of FIG. 12A.

DETAILED DESCRIPTION OF THE PREFERRED EMBODIMENTS

Figure 1:
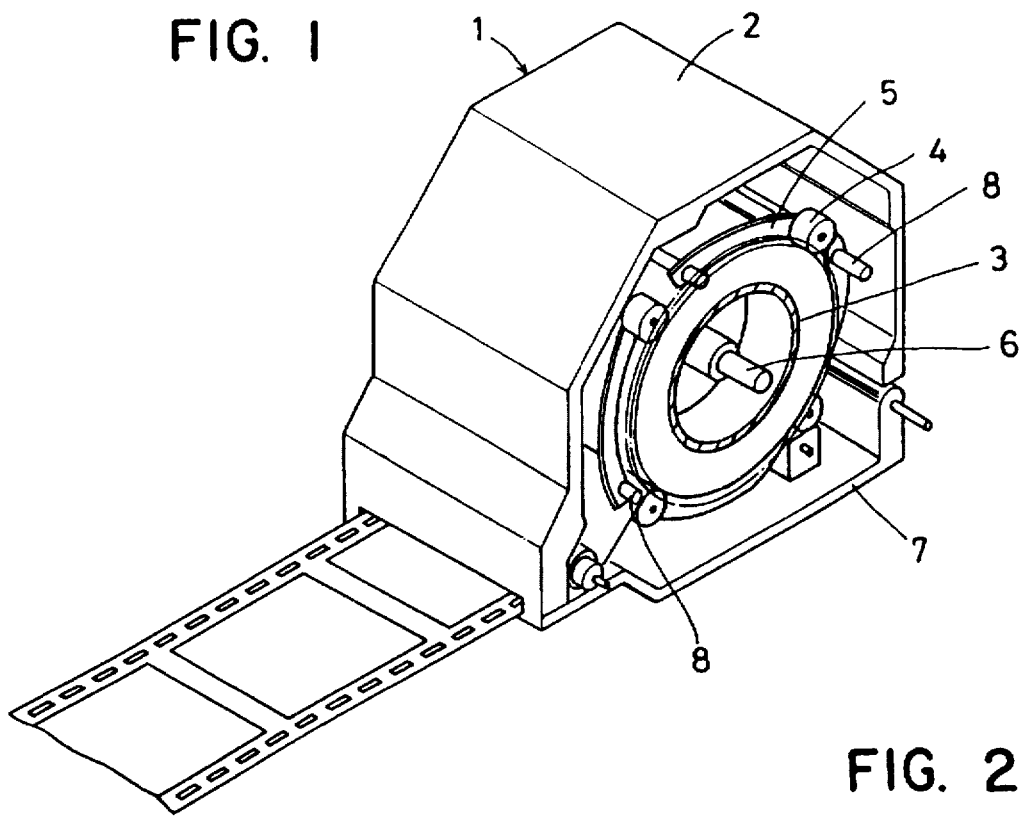
FIG. 1 is a perspective view of a first embodiment of the continuous film feed device according to the present invention, with a side over thereof removed.
Figure 2:
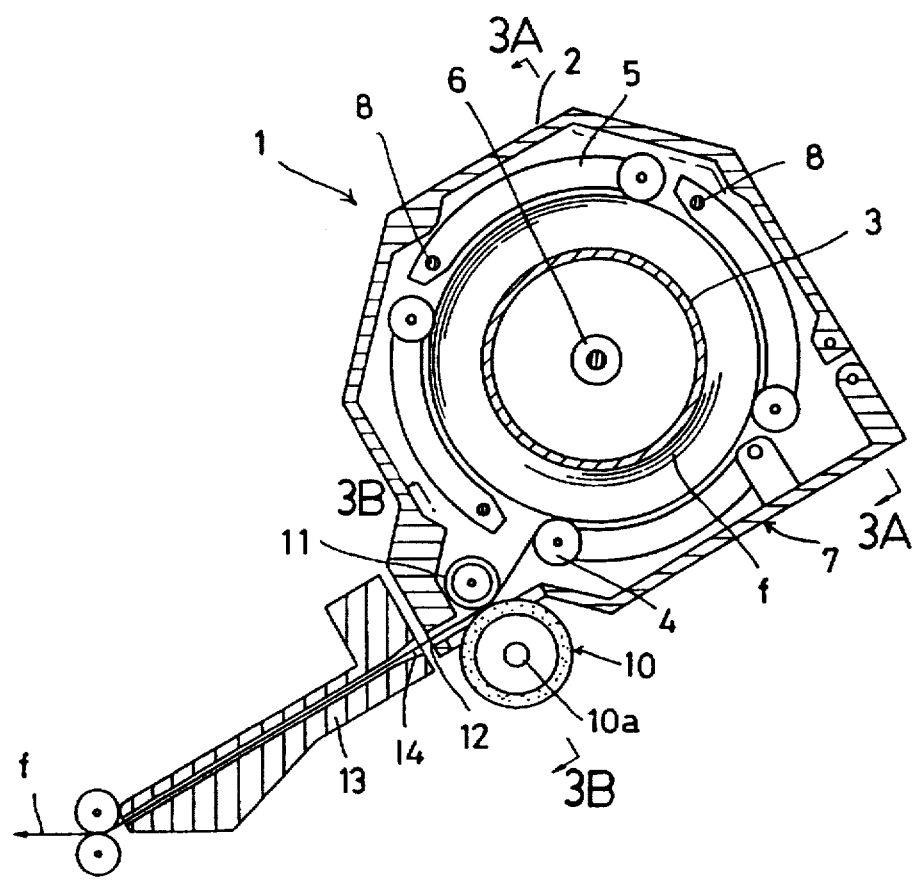
FIG. 2 is a vertical sectional view of the same.
Figure 3A:
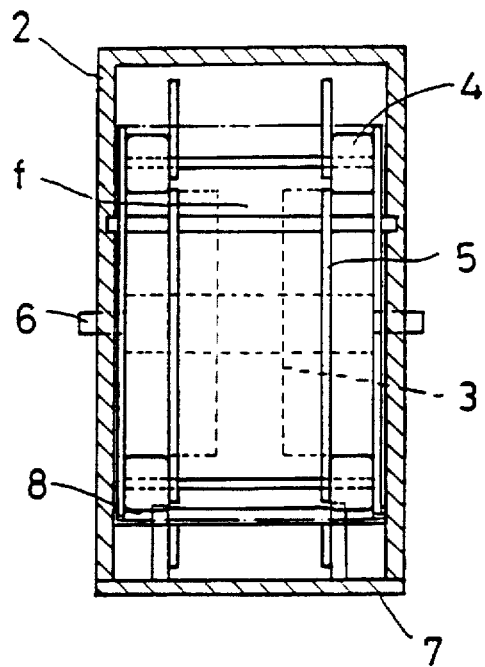
FIGS. 3A and 3B are sectional views taken alone lines 3A—3A and 3B—3B of FIG. 2.
Figure 3B:
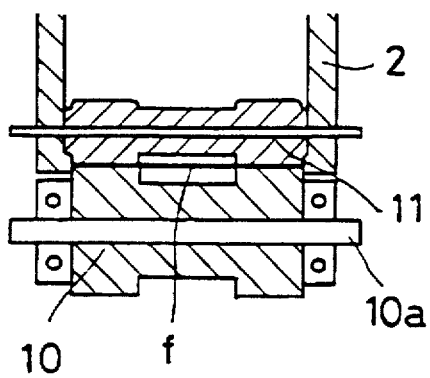

Referring to FIG. 1, the continuous film feed device 1 comprises a case 2, a film take-up core 3 rotatably mounted in the case 2, and a plurality (four in the illustrated embodiment) of roller support arms 5 each having a film presser roller 4 for pressing the film toward the center of the core 3. The film take up core 3 is supported on a rotary shaft 6. Numeral 7 designates a lid of the case 2. FIG. 2 is a side view of the continuous film feed device. FIGS. 3A and 3B are sectional views taken along lines 3A—3A and 3B—3B of FIG. 2, respectively. The roller support arms 5 are supported on respective support shafts 8 and are biased by springs (not shown) so that their tips are urged lightly toward the center of the film take-up core 3 to press the film toward its center at all times. The springs may be coil springs provided around the support shafts 8 or leaf springs having a suitable shape and provided along the respective roller support rams 5.

At one corner of the case 2 are provided a pair of rollers comprising a feed roller 10 for feeding a film and which is provided outside the case 2, and a mating or idler roller 11 provided inside the case 2. Film is fed out through a film outlet 12 formed in one end of the case 2. The feed roller 10 is a one-way roller. If the film being fed is pulled with a torque higher than a predetermined value, the feed roller 10 will go idle. When the pulling force disappears, the film is fed by the feed roller 10. In front of the film outlet 12 is provided a film guide 13 through which the film is fed in a desired direction. The feed roller 10 is a driving roller for film and has a shaft 10a connected to and driven by a driving source such as a motor. The lid 7 is hinged to the case at an end thereof opposite roller 10 and can be opened and closed manually.

The continuous film feed device 1 of this embodiment is used as follows.

Figure 5:
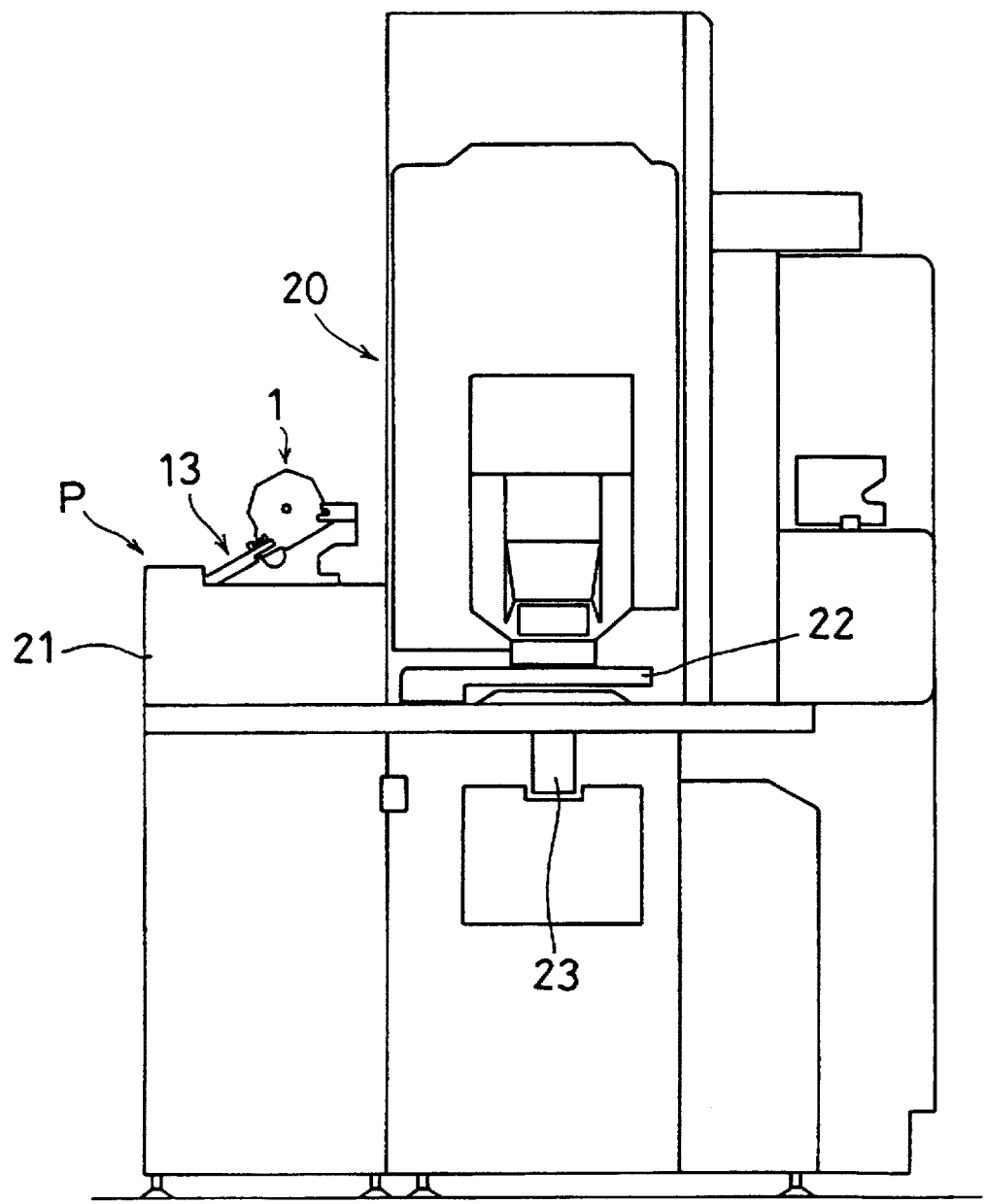
FIG. 5 is a front view of the photographic printing apparatus.
Figure 6:
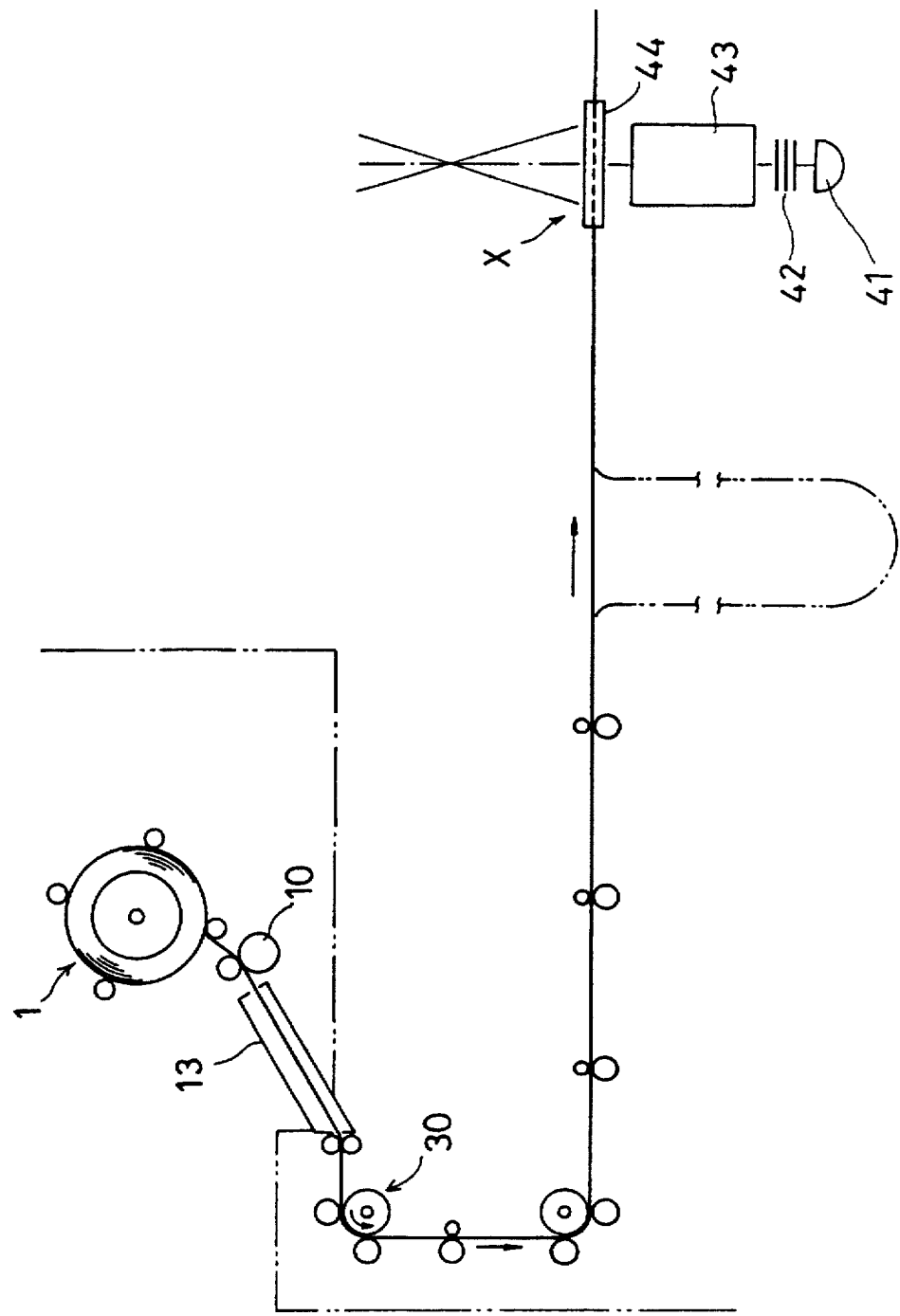
FIG. 6 is a view showing how the film is fed in the same.

As shown in FIGS. 5 and 6, the continuous film feed device 1 is mounted on a photographic printing apparatus 20 near a film infeed portion P thereof, together with the film guide 13 or with the film guide 13 coupled to the device 1 beforehand. Numerals 22 and 23 designate an automatic negative mask and a mirror tunnel, respectively. Mounted in the photographic printing apparatus 20 is an external film feed device or carrier device 30 comprising a plurality of rollers as shown in FIG. 6. Films f fed from the continuous film feed device 1 are sent to a printing/exposure stage X by the carrier device 30 for printing and exposure. However, since this portion is not directly related to the present invention, detailed description thereof is omitted. Numeral 41 denotes a light source, 42 denotes a light-adjusting filter, 43 denotes a mirror tunnel, and 44 denotes a negative mask.

Figure 4:
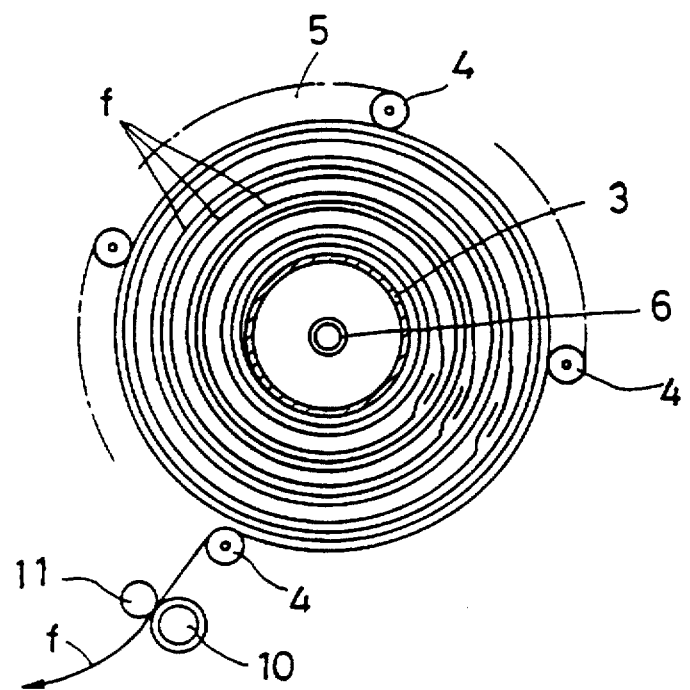
FIG. 4 is a view showing how the films are wound.

A plurality of (e.g. 5–10) films f are wound onto core 3 of the film feed device 1 with their ends (where there are no picture frames) overlapped as shown in FIG. 4. Since films f are extremely thin, the diameter of the roll of films will not increase substantially even when they are wound with their ends overlapped. The overlapped portions are formed by sliding the leading end of each film under the trailing end of the previous or last wound film (relative to a direction of winding of films f on core 3). Since the overlapped portions are always pressed by the film presser rollers 4, the films are fed continuously. When winding films on the continuous film feed device 1, after opening the lid 7 of the case 2, films are wound one after another so that their ends overlap with each other as described above.

When feeding films f from the device 1, the leading end of the topmost film (relative to a direction of unwinding of films f) is set between the feed roller 10 and its mating roller 11 beforehand. In this state, by driving the feed roller 10 through its rotary shaft 10a, the films are fed.

When each film is fed into the photographic printing apparatus 20, it is pulled in at high speed by high-speed roller 30 (FIG. 6) provided near the inlet of the photographic printing apparatus. Thereafter, the feed roller 10 in the continuous film feed device will idle. When the overlapped portio of the films moves past the feed roller 10, the pressure on the overlapped portion is released. The film is thus separated from the subsequent films. When the feed roller 10 begins idling, transmission of the driving force to the feed roller 10 will stop. Thus, the moment the preceding film f is separated, the feed roller 10 will stop rotating and be kept in this position with the leading end of the subsequent film sandwiched between the feed roller 10 and its mating roller 11. Each film is thus fed into the photographic printing apparatus 20. After a predetermined interval, the feed roller 10 is activated to feed the next film into apparatus 20.

With this arrangement, when winding a plurality of films in the continuous film feed device 1, there is no need to splice them together. Films can be fed continuously without the need for any film connecting means.

Figure 7:
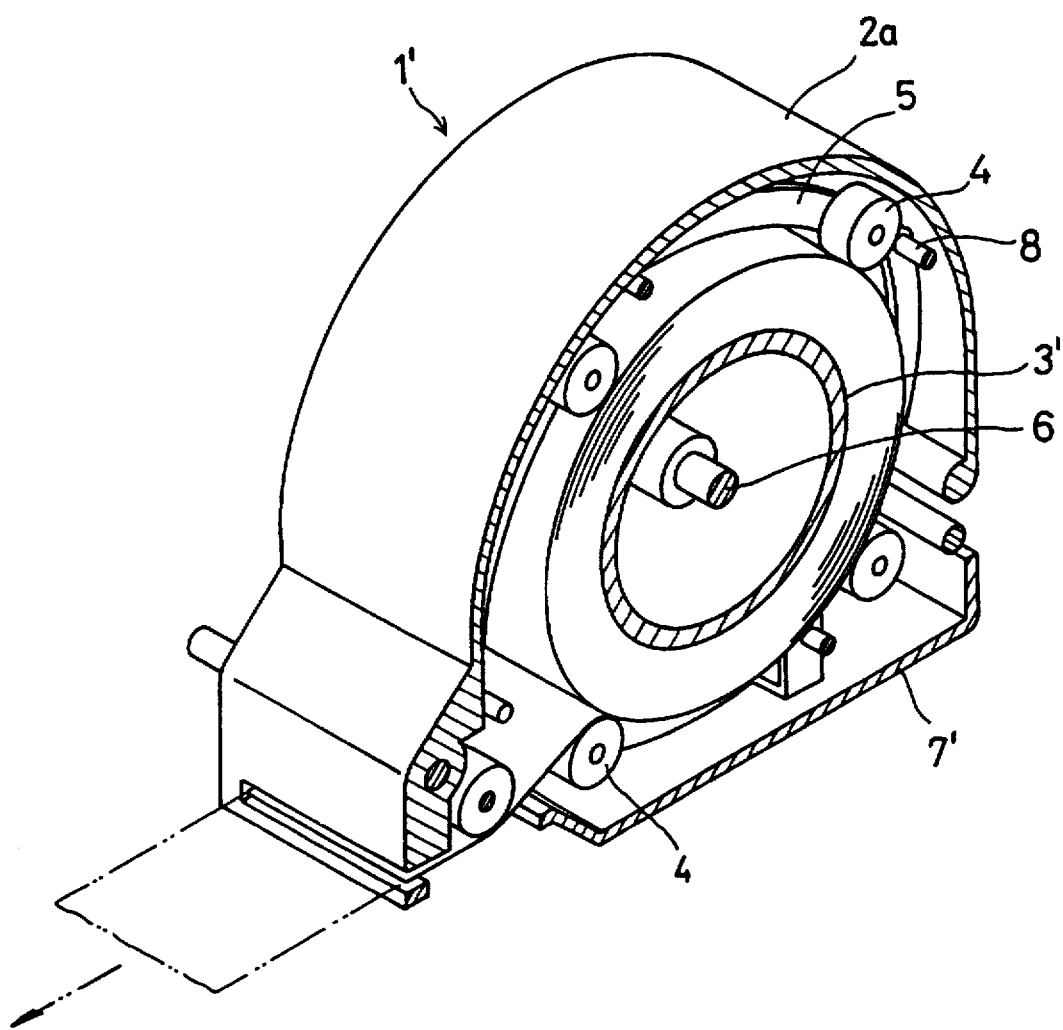
FIG. 7 is a perspective sectional view of a second embodiment.

FIG. 7 is a perspective view of another embodiment of the continuous film feed device, and FIG. 8 is a sectional view thereof. Basically, this embodiment has the same structure as the first embodiment but differs therefrom mainly in its outer shape, in that it can be mounted on a mounting base and in that it is provided with a film end presser mechanism that utilizes the lid of the case. Elements that are the same as those in the first embodiment are denoted by the same numerals.

In this embodiment, the case 2a has a semicircular outer configuration. A mounting base 21 is provided on a top surface of the case of the photographic printing apparatus 20. The case 2a of the continuous film feed device 1' is detachably and obliquely mounted on the mounting base 21 together with a film guide 13a. The mounting base 21 is a substantially triangular, vertical plate as shown. The case 2a is mounted on a front side of the vertical plate, while a driving motor M for driving a feed roller member 100 is mounted on an opposite side thereof. Feed roller member 100 includes a pair of feed rollers 10' mounted at opposite ends of a drum 10" of diameter less than feed rollers 10'.

A mounting seat 15 is provided at the end of the film guide 13, while another mounting seat 24 is provided on top of the mounting base 21. Mounting seats 15 and 24 have recesses in which are received mounting pins 16 and 17 that support the case 2a. Although not shown, means are provided for preventing the mounting pins 16, 17 from coming out.

FIGS. 9A and 9B are sectional views taken along lines 9A—9A and 9B—9B of FIG. 8, respectively. Feed roller member 100 is mounted in a cantilever fashion on a rotary shaft 10a' extending through the mounting base 21. A timing belt 10b extends around the rotary shaft 10a' at its opposite end, and timing belt 10b is also in engagement with driving motor M shown in FIG. 8.

FIG. 10 corresponds to FIG. 4 and illustrates how the films are fed. As will be apparent from FIG. 10, films f are wound with their ends overlapped but not spliced as with the first embodiment. Namely, the leading end of each film is slid under a trailing end of the preceding film (relative to a direction of winding of films f). The length of the overlapping portion between the adjacent films has to be longer than the distance between the feed roller member 100 and the film presser roller 4 closest thereto in the unwinding direction of the films. In this embodiment, film take-up core 3' has a film leading end presser member 3a whereby the leading end of the first or innermost film (relative to the winding direction) can be reliably fastened to the core 3'. Presser member 3a is made of a spring material. When all the films are unrolled completely, a tip of presser member 3a will spring up slightly from the surface of the core 3'. A new film is inserted into the space between the presser member 3a and the core 3' and is wound around the core.

FIG. 11A is a partial enlarged view of a portion of the device in the vicinity of one feed roller 10'. FIG. 11B is a sectional view taken along line 11B—11B of FIG. 11A. As shown, feed rollers 10' are provided at opposite ends of drum 10" and have respective diameters each larger than that of the drum. The lid 7' is formed with openings 18 that are wide enough to receive respective rollers 10'. Thus, a portion of the lid 7' between openings 18 protrudes inwardly from the inner surface of the lid 7' as a film presser 19. Mating or idler rollers 11' are mounted on a rotary shaft which carries at its protruding ends spring bearings 11a which are resiliently supported by coil springs 11b provided at opposite sides of the case 2a. Thus, as shown in FIG. 11A, with the case 2a of the continuous film feed device 1' mounted on the mounting base 21, feed rollers 10' are received in the respective openings 18 and partially protrude inward, thus pressing the mating rollers 11'. The contact surfaces between both rollers are thus located inwardly of the inner surface of the lid 7' of the case 2a. Films f are fed in this state.

With the continuous film feed device 1' removed from the mounting base 21, the film leading end is held in position by lid 7' in the following manner. FIGS. 12A and 12B show the state in which the continuous film feed device 1' is detached and the film leading end is pulled in to the area near the film outlet 12 of the case 21. By closing lid 7' in this state, although the feed rollers 10' and mating rollers 11' disengage, the film presser 19, which is a part of the lid 7', is now pressed against small-diameter portions 11c of the mating rollers 11', with the film sandwiched therebetween. Thus, by closing the lid 7', the leading end of the film is automatically pressed between presser 19 and roller portions 11c and held in position in the case 2a.

What is claimed is:

1. A method of preparing a plurality of separate films for continuous successive feed thereof and of then continuously successively feeding said separate films, said method comprising:

winding said plurality of separate films in a winding direction one after another around a film core that is rotatably supported in a case, said winding comprising overlapping adjacent ends of adjacent said films by inserting a leading end, relative to said winding direction, of a succeeding film of each adjacent pair of said films beneath a trailing end of a preceding film of said pair of films, while maintaining all of said films separate from and not integrally attached to any other of said films;

pressing said films toward a center of said film core by rollers;

sandwiching a trailing end of an outermost said film wound on said film core, relative to said winding direction, between a one-way driving feed roller and an idler roller, said driving feed roller being operable to be positively driven in a feeding direction of rotation thereof and to idle in said feeding direction of rotation thereof when said outermost film is pulled in an unwinding direction, that is opposite to said winding direction, at a speed that is greater than a speed at which said driving feed roller is driven;

activating said driving feed roller to rotate in said feeding direction and thereby feeding said outermost film toward an external film feed device in said unwinding direction, at which time said end of said outermost film becomes a leading end thereof;

when said leading end of said outermost film, relative to said unwinding direction, reaches said external film feed device, grasping said leading end by said external film feed device and pulling said outermost film thereby in said unwinding direction at said speed greater than a driving speed on said driving feed roller;

while said outermost film remains sandwiched between said driving feed roller and said idler roller and during said pulling of said outermost film by said external film feed device, causing said driving feed roller to idle in said feeding direction; and when said driving feed roller begins to idle, deactivating said driving feed roller.

2. A film feed device for continuously successively feeding a plurality of separate films, said device comprising:

a case having an openable lid and an outlet;

a film core rotatably mounted in said case and adapted to have wound thereon a plurality of separate films;

a plurality of arms disposed around said film core, each said arm having a first end pivoted to a respective pin mounted in said case and a second end having rotatably mounted thereon a respective roller, and each said arm being biased by a respective spring to pivot about said respective pin to move said respective roller toward a center of said film core;

an idler roller mounted in said case adjacent said outlet;

a feed roller mounted outside said case adjacent said outlet at a position such that a film being unwound from said film core and passed through said outlet is sandwiched between said idler roller and said feed roller, said feed roller comprising a one-way roller operable to be positively driven at a driving speed by a drive means in a feeding direction of rotation thereof and to idle when rotated in said feeding direction of rotation thereof at a speed greater than said driving speed; and whereby when a film sandwiched between said idler roller and said feed roller is pulled outwardly at said speed greater than said driving speed of rotation of said feed roller in said feeding direction, thus tending to cause rotation of said feed roller at said greater speed, said feed roller is caused to idle.

3. A device as claimed in claim 2, wherein said lid has therein an opening configured to accommodate said feed roller, said lid has a portion adjacent said opening, and further comprising biasing means for urging said idler roller in a direction to sandwich a film between said idler roller and said feed roller when said feed roller is accommodated in said opening, and when said feed roller is withdrawn from said opening, to sandwich a film between said idler roller and said portion of said lid.

4. A device as claimed in claim 2, further comprising an external film feed device operably positioned to pull the film sandwiched between said idler roller and said feed roller at said greater speed.

* * * * *